US010991392B2

(12) United States Patent
Vilermo et al.

(10) Patent No.: US 10,991,392 B2
(45) Date of Patent: Apr. 27, 2021

(54) APPARATUS, ELECTRONIC DEVICE, SYSTEM, METHOD AND COMPUTER PROGRAM FOR CAPTURING AUDIO SIGNALS

(71) Applicant: Nokia Technologies Oy, Espoo (FI)

(72) Inventors: Miikka Tapani Vilermo, Siuro (FI); Koray Ozcan, Hampshire (GB); Toni Henrik Mäkinen, Pirkkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/486,646

(22) Filed: Apr. 13, 2017

(65) Prior Publication Data
US 2017/0316803 A1 Nov. 2, 2017

(30) Foreign Application Priority Data

Apr. 29, 2016 (GB) ..................... 1607455

(51) Int. Cl.
G06F 17/00 (2019.01)
G11B 20/10 (2006.01)
(Continued)

(52) U.S. Cl.
CPC ........ *G11B 20/10527* (2013.01); *G01S 5/186* (2013.01); *G01S 5/26* (2013.01);
(Continued)

(58) Field of Classification Search
CPC .... G11B 2020/10546; G11B 20/00992; G11B 20/10527; H04R 1/326; H04R 2499/11;
(Continued)

(56) References Cited

U.S. PATENT DOCUMENTS 7,957,765 B1 * 6/2011 Causey ............... H04M 1/0256
455/550.1
8,325,270 B2 * 12/2012 Woodman ............. G03B 17/02
348/375
(Continued)

FOREIGN PATENT DOCUMENTS

CN 104705957 A 6/2015
EP 1524189 A1 4/2005
(Continued)

OTHER PUBLICATIONS

"iPhone 6 / 6s Smart Battery Case—Charcoal Grey", Apple, Retrieved on Apr. 19, 2017, Webpage available at : https://www.apple.com/uk/shop/product/MGQL2ZM/A/iphone-6-6s-smart-battery-case-charcoal-grey?fnode=42.

(Continued)

Primary Examiner — Paul C McCord
(74) Attorney, Agent, or Firm — Alston & Bird LLP

(57) ABSTRACT

An apparatus, method and computer program, the apparatus comprising: processing circuitry; and memory circuitry including computer program code, the memory circuitry and the computer program code configured to, with the processing circuitry, enable the apparatus to: enable a wireless connection to be established with an electronic device; capture an audio signal and enable the captured audio signal to be sent to the electronic device using the wireless connection to enable the captured audio signal to be used to create an enhanced audio signal; and wherein the apparatus is arranged to be removeably attachable to the electronic device.

19 Claims, 7 Drawing Sheets

(51) Int. Cl.
*G06F 1/16* (2006.01)
*H04M 1/04* (2006.01)
*G10L 21/0364* (2013.01)
*G01S 5/26* (2006.01)
*H04M 1/725* (2021.01)
*G01S 5/18* (2006.01)
*G11B 20/00* (2006.01)
*H04R 1/32* (2006.01)
*H04R 3/00* (2006.01)
*A45C 11/00* (2006.01)
*G10L 21/0216* (2013.01)
*G10L 21/0208* (2013.01)

(52) U.S. Cl.
CPC ........ *G06F 1/1632* (2013.01); *G10L 21/0364* (2013.01); *G11B 20/00992* (2013.01); *H04M 1/04* (2013.01); *H04M 1/72527* (2013.01); *H04R 1/326* (2013.01); *H04R 3/005* (2013.01); *A45C 2011/002* (2013.01); *G10L 21/0208* (2013.01); *G10L 2021/02166* (2013.01); *G11B 2020/10546* (2013.01); *H04R 2420/07* (2013.01); *H04R 2499/11* (2013.01)

(58) Field of Classification Search
CPC ............... H04R 3/005; H04R 2420/07; A45C 2011/002; G01S 5/186; G01S 5/26; G06F 1/1632; G10L 2021/02166; G10L 21/02; G10L 21/0208; G10L 21/0364; H04M 1/04; H04M 1/72527
USPC ........................................................ 700/94
See application file for complete search history.

(56) References Cited

U.S. PATENT DOCUMENTS

| | | | |
|---|---|---|---|
| 8,825,124 B1 | 9/2014 | Davies et al. | |
| 8,861,739 B2 | 10/2014 | Ojanpera | |
| 9,271,061 B1* | 2/2016 | Amores | H04R 1/028 |
| 9,398,241 B2* | 7/2016 | Ito | H04W 76/10 |
| 9,966,985 B2* | 5/2018 | DiLaura | A45C 11/38 |
| 10,222,833 B2* | 3/2019 | Kim | G06F 1/1652 |
| 2001/0027121 A1* | 10/2001 | Boesen | G06F 1/1616 |
| | | | 455/556.2 |
| 2007/0133826 A1* | 6/2007 | Burk | H04R 3/005 |
| | | | 381/122 |
| 2007/0248238 A1* | 10/2007 | Abreu | G02C 3/003 |
| | | | 381/381 |
| 2008/0304688 A1 | 12/2008 | Kumar | |
| 2009/0017881 A1 | 1/2009 | Madrigal | |
| 2009/0181731 A1* | 7/2009 | Seshadri | H04M 1/05 |
| | | | 455/575.2 |
| 2010/0054519 A1* | 3/2010 | Mulvey | G06F 1/1632 |
| | | | 381/386 |
| 2011/0287726 A1 | 11/2011 | Huang | |
| 2012/0330653 A1 | 12/2012 | Lissek et al. | |
| 2013/0156219 A1* | 6/2013 | Proebstel | H04R 1/2803 |
| | | | 381/91 |
| 2013/0315402 A1* | 11/2013 | Visser | G10L 19/00 |
| | | | 381/18 |
| 2014/0023197 A1* | 1/2014 | Xiang | H04S 1/007 |
| | | | 381/17 |
| 2014/0080553 A1* | 3/2014 | Torset | G06F 1/1632 |
| | | | 455/575.8 |
| 2014/0361876 A1 | 12/2014 | Abdelsamie et al. | |
| 2015/0078575 A1* | 3/2015 | Selig | H04R 1/1025 |
| | | | 381/74 |
| 2015/0110275 A1* | 4/2015 | Tammi | H04R 1/08 |
| | | | 381/26 |
| 2015/0138064 A1* | 5/2015 | Li | G02B 27/017 |
| | | | 345/156 |
| 2015/0163393 A1* | 6/2015 | Kim | H04N 5/23206 |
| | | | 455/419 |
| 2015/0189058 A1 | 7/2015 | Hwang | |
| 2015/0296294 A1 | 10/2015 | Paquier et al. | |
| 2016/0006920 A1* | 1/2016 | Gomes Da Motta | ........................ |
| | | | H04N 5/2257 |
| | | | 348/207.11 |
| 2016/0007131 A1 | 1/2016 | Tammi et al. | |
| 2016/0012794 A1* | 1/2016 | Takata | G09G 3/3685 |
| | | | 345/209 |
| 2016/0165341 A1* | 6/2016 | Benattar | G01S 3/801 |
| | | | 381/92 |
| 2016/0330545 A1* | 11/2016 | McElveen | H04R 3/005 |
| 2017/0023975 A1* | 1/2017 | Nalbandian | H04R 1/028 |
| 2017/0026740 A1* | 1/2017 | Kirsch | H04M 3/568 |
| 2017/0150255 A1* | 5/2017 | Wang | H04R 3/005 |

FOREIGN PATENT DOCUMENTS

| | | |
|---|---|---|
| WO | 2006/004632 A1 | 1/2006 |
| WO | 2011/067292 A1 | 6/2011 |
| WO | 2015/026859 A1 | 2/2015 |

OTHER PUBLICATIONS

Pertila et al., "Passive Self-Localization of Microphones Using Ambient Sounds", Proceedings of the 20th European Signal Processing Conference, Aug. 27-31, 2012, pp. 1314-1318.
"AMP—Your Phone Has Never Sounded Better", Ampaudio, Retrieved on Feb. 25, 2016, Webpage available at : https://www.ampaudio.com/.
"Speaker Case", ZAGG, Retrieved on Apr. 19, 2017, Webpage available at : http://www.zagg.com/us/en_us/cases/iphone-6-case/speaker-case.
Search Report received for corresponding United Kingdom Patent Application No. 1607455.1, dated Oct. 11, 2016, 4 pages.
Extended European Search Report received for corresponding European Patent Application No. 17163198.9, dated Aug. 10, 2017, 8 pages.
Office action received for corresponding European Patent Application No. 17163198.9, dated Jul. 3, 2018, 8 pages.
Office Action for European Application No. 17163198.9 dated Jul. 3, 2018.
Summons to Attend Oral Proceedings for European Application No. 17163198.9 dated Apr. 3, 2019, 11 pages.

* cited by examiner

APPARATUS, ELECTRONIC DEVICE, SYSTEM, METHOD AND COMPUTER PROGRAM FOR CAPTURING AUDIO SIGNALS

TECHNOLOGICAL FIELD

Examples of the disclosure relate to an apparatus, electronic device, system, method and computer program for capturing audio signals. In particular examples of the disclosure relate to an apparatus, electronic device, system, method and computer program for capturing audio signals by microphones distributed in different locations.

BACKGROUND

Apparatus for capturing audio signals are known. Some apparatus enable a user to capture enhanced audio signals such as spatial audio signals. The spatial audio signals may be signals which have directional properties. The spatial audio signals may be signals which enable the directional properties of sounds to be recreated. Other types of enhanced audio signals may comprise a beamformed audio signal, a noise cancelled audio signal, a stereo audio signal.

It is useful to provide improved devices to enable users to capture enhanced audio signals. For instance, if the spatial audio recording capabilities of a mobile electronic device can be improved this may make it easier for a user to obtain high quality spatial audio recordings.

BRIEF SUMMARY

According to various, but not necessarily all, examples of the disclosure there is provided an apparatus comprising: processing circuitry; and memory circuitry including computer program code, the memory circuitry and the computer program code configured to, with the processing circuitry, enable the apparatus to: enable a wireless connection to be established with an electronic device; capture an audio signal and enable the captured audio signal to be sent to the electronic device using the wireless connection to enable the captured audio signal to be used to create an enhanced audio signal; and wherein the apparatus is arranged to be removably attachable to the electronic device.

The processing circuitry and the memory circuitry may be configured to enable a position of the apparatus relative to the electronic device to be determined and to enable the determined position of the apparatus relative to the electronic device to be used to create the enhanced audio signal.

Determining the position of the apparatus relative to the electronic device may comprise determining the location of the apparatus relative to the electronic device.

Determining the position of the apparatus relative to the electronic device may comprise determining an orientation of the apparatus.

Determining the position of the apparatus relative to the electronic device may comprise determining the position of the apparatus relative to a field of view of a camera of the electronic device.

The enhanced audio signal may comprise at least one of; a spatial audio signal, a beamformed audio signal, a noise cancelled audio signal, a stereo audio signal.

The processing circuitry and the memory circuitry may be configured to enable at least some processing of the captured audio signal before it is transmitted to the electronic device.

The processing circuitry and the memory circuitry may be configured to enable the apparatus to receive control signals from the electronic device. The received control signals may enable control of the audio signals that are to be captured. The received control signals may enable control of processing of the captured audio signals before they are transmitted to the electronic device.

The enhanced audio signal may be created from at least one audio signal captured by the apparatus and at least one audio signal captured by the electronic device.

According to various, but not necessarily all, examples of the disclosure the apparatus may be provided in a removable cover for the electronic device.

The removable cover may comprise one or more microphones.

The removable cover may comprise a power source.

The removable cover may comprise one or more transceivers configured to enable wireless communications.

According to various, but not necessarily all, examples of the disclosure there may be provided an electronic device configured to be removably attached to an apparatus as described above.

The electronic device may comprise at least one camera.

The electronic device may comprise one or more microphones.

According to various, but not necessarily all, examples of the disclosure there may be provided a system comprising an apparatus as described above and an electronic device as described above.

According to various, but not necessarily all, examples of the disclosure there may be provided a method comprising: enabling a wireless connection to be established between an apparatus and an electronic device; capturing an audio signal and enabling the captured audio signal to be sent to the electronic device using the wireless connection to enable the captured audio signal to be used to create an enhanced audio signal; and wherein the apparatus is arranged to be removably attachable to the electronic device.

The method may comprise enabling a position of the apparatus relative to the electronic device to be determined and enabling the determined position of the apparatus relative to the electronic device to be used to create the enhanced audio signal.

Determining the position of the apparatus relative to the electronic device may comprise determining the location of the apparatus relative to the electronic device.

Determining the position of the apparatus relative to the electronic device may comprise determining an orientation of the apparatus.

Determining the position of the apparatus relative to the electronic device may comprise determining the position of the apparatus relative to a field of view of a camera of the electronic device.

The enhanced audio signal may comprise at least one of; a spatial audio signal, a beamformed audio signal, a noise cancelled audio signal, a stereo audio signal.

The method may comprise performing at least some processing of the captured audio signal before it is transmitted to the electronic device.

The method may comprise receiving control signals from the electronic device. The received control signals may enable control of the audio signals that are to be captured. The received control signals may enable control of processing of the captured audio signals before they are transmitted to the electronic device.

The enhanced audio signal may be created from at least one audio signal captured by the apparatus and at least one audio signal captured by the electronic device.

According to various, but not necessarily all, examples of the disclosure there may be provided a computer program comprising computer program instructions that, when executed by processing circuitry, enable: enabling a wireless connection to be established between an apparatus and an electronic device; capturing an audio signal and enabling the captured audio signal to be sent to the electronic device using the wireless connection to enable the captured audio signal to be used to create an enhanced audio signal; and wherein the apparatus is arranged to be removeably attachable to the electronic device.

According to various, but not necessarily all, examples of the disclosure there may be provided a computer program comprising program instructions for causing a computer to perform any of the methods described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided an electronic device comprising: processing circuitry; and memory circuitry including computer program code, the memory circuitry and the computer program code configured to, with the processing circuitry, enable the apparatus to: enable a wireless connection to be established with a cover wherein the cover comprises one or more microphones; enable a captured audio signal to be received from the cover using the wireless connection wherein the audio signal is captured by the one or more microphones of the cover; enable the captured audio signal to be used to create an enhanced audio signal; and wherein the cover is arranged to be removeably attachable to the electronic device.

According to various, but not necessarily all, example of the disclosure there may be provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Figure 1:
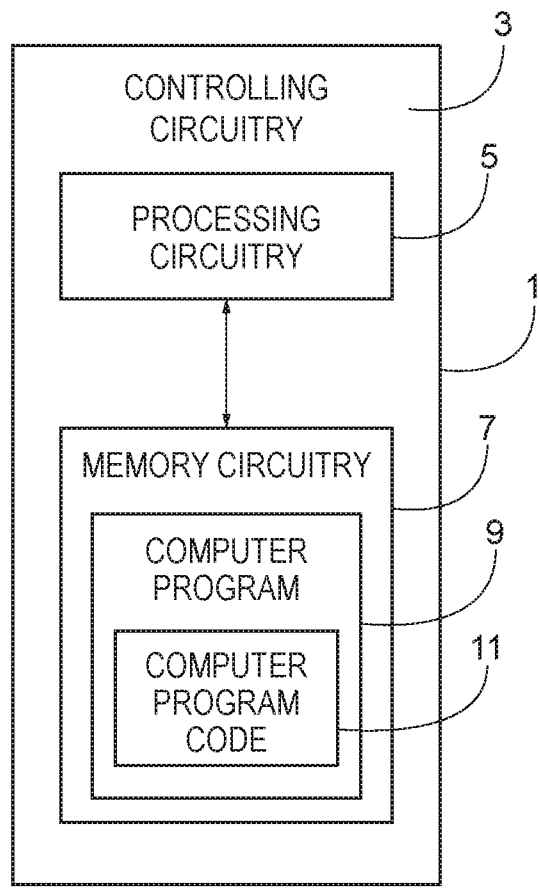
FIG. 1 illustrates an apparatus.

The Figures illustrate an apparatus 1 comprising: processing circuitry 5; and memory circuitry 7 including computer program code 11, the memory circuitry 7 and the computer program code 11 configured to, with the processing circuitry 5, enable the apparatus 1 to: enable 71 a wireless connection to be established with an electronic device 31; capture 73 an audio signal and enable the captured audio signal to be sent to the electronic device 31 using the wireless connection to enable the captured audio signal to be used to create an enhanced audio signal; and wherein the apparatus 1 is arranged to be removeably attachable to the electronic device 31.

The apparatus 1 may be for enabling audio signals to be captured. In some examples the apparatus 1 may be for enabling enhanced audio signals such as spatial audio signals to be captured. In some examples the apparatus 1 may be provided in a cover 21 for an electronic device 31. The cover 21 may be configured to be removably attached to the electronic device 31 so that a user may place the electronic device 31 in a first position and the removable cover 21 in a second position to enable spatial audio signals to be captured.

Figure 2:
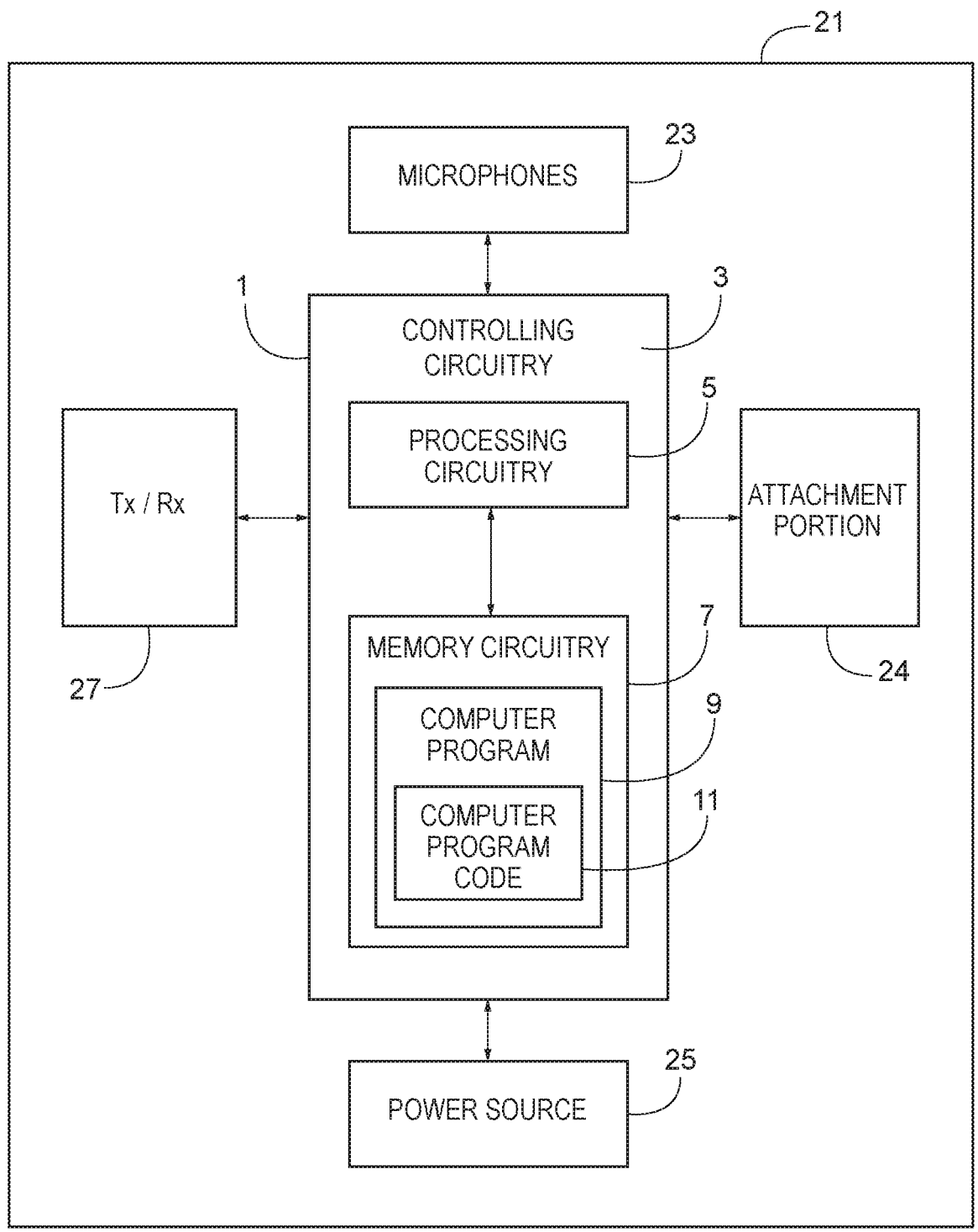
FIG. 2 illustrates an apparatus within a cover for an electronic device

FIG. 1 schematically illustrates an example apparatus 1 which may be used in examples of the disclosure. The apparatus 1 illustrated in FIG. 1 may be a chip or a chip-set. In some examples the apparatus 1 may be provided within a cover 21 of an electronic device 31. An example cover 21 is illustrated in FIG. 2.

The example apparatus 1 comprises controlling circuitry 3. The controlling circuitry 3 may provide means for controlling other components of the cover 21. The controlling circuitry 3 may also provide means for performing the methods or at least part of the methods of examples of the disclosure.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods illustrated in FIG. 7. The processing circuitry 5 by reading the memory circuitry 7 is able to load and execute the computer program 9.

In some examples the computer program 9 may comprise an audio capturing application. The audio capturing application may be configured to capture audio signals obtained by one or more microphones and may enable the captured audio signals to be stored in the memory circuitry 7. In some examples the audio capturing application may enable some processing of the audio signal before it is transmitted to an electronic device.

In some examples the computer program 9 may comprise a positioning application. The positioning application may be configured to enable the position of the apparatus 1 to be determined. The positioning application may enable the position of the apparatus 1 relative to the electronic device 31 to be determined. The positioning application may enable the location of the apparatus 1 relative to the electronic device 31 to be determined. In some examples the positioning application may enable the orientation of the apparatus 1 relative to the electronic device 31 to be determined. In some examples the positioning application may enable the position of the apparatus 1 relative to a field of view of a camera of the electronic device 31 to be determined.

The apparatus 1 therefore comprises: processing circuitry 5; and memory circuitry 7 including computer program code 11, the memory circuitry 7 and computer program code 11 configured to, with the processing circuitry 5, cause the apparatus 1 at least to perform: enabling 71 a wireless connection to be established with an electronic device 31; capturing 73 an audio signal and enabling the captured audio signal to be sent to the electronic device 31 using the wireless connection to enable the captured audio signal to be used to create an enhanced audio signal; and wherein the apparatus 1 is arranged to be removeably attachable to the electronic device 31.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal. In some examples the computer program code 11 may be transmitted to the apparatus 1 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

Although the memory circuitry 7 is illustrated as a single component in the Figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates an apparatus 1 within a cover 21 for an electronic device 31. The cover 21 comprises an apparatus 1, one or more microphones 23, a power source 25, one or more transceivers 27 and an attachment portion 29. It is to be appreciated that in some examples the cover 21 may comprise other components that are not illustrated in FIG. 2. For example the cover 21 may comprise a camera or an accelerometer or other suitable components.

The apparatus 1 may be as described above in relation to FIG. 1 and corresponding reference numerals are used for corresponding features.

The one or more microphones 23 may comprise any means which may enable an audio signal to be converted into an electrical signal. The one or more microphones 23 may comprise any suitable type of microphones 23. In some examples the microphones 23 may comprise digital microphones. In some examples the microphones 23 may comprise analogue microphones. In some examples the one or more microphones 23 may comprise an electret condenser microphone (ECM), a micro electro mechanical system (MEMS) microphone or any other suitable type of microphone.

The one or more microphones 23 may be coupled to the apparatus 1 to enable the apparatus 1 to process the audio signals detected by the plurality of microphones 23.

In some examples the cover 21 may comprise a plurality of microphones. The plurality of microphones may be located in different positions within the cover 21 so as to enable a spatial audio signal to be obtained by the apparatus 1 in the cover 21.

The power source 25 may comprise any means which may be configured to provide power to the components of the cover 21 such as the processing circuitry 5 and the microphones 23. In some examples the power source 25 may comprise a battery. In other examples the power source 25 could comprise a photovoltaic power source or any other suitable means.

The one or more transceivers 27 may comprise one or more transmitters and/or receivers. The one or more transceivers 27 may comprise any means which enables the apparatus 1 to establish a communication connection with an electronic device 31 and exchange information with the electronic device 31. The communication connection may comprise a wireless connection.

Any suitable methods or processes may be used to establish a communication connection between the apparatus 1 and an electronic device 31. The communication connection could be established using a known connection between the apparatus 1 and an electronic device 31. The connection process could be initiated by either the apparatus 1 or the electronic device 31. In some examples the communication connection could be established by an automatic pairing between the apparatus 1 and an electronic device 31. For example, if the apparatus 1 and the electronic device are NFC enabled the communication connection could be established automatically.

In some examples the one or more transceivers 27 may enable the apparatus 1 to communicate in local area networks such as wireless local area networks (WLAN), Bluetooth networks or any other suitable networks. In some examples the one or more transceivers 27 may enable short range communications between the apparatus 1 and an electronic device 31 such as near field communications (NFC) or any other suitable communication link.

The one or more transceivers 27 may be coupled to the apparatus 1 within the cover 21. The one or more transceivers 27 may be configured to receive signals from the apparatus 1 to enable the signals to be transmitted. The signals to be transmitted may comprise the captured audio signals. The audio signals may be transmitted to the electronic device 31.

The attachment portion 29 may comprise any means which enables the cover 21 to be attached to the electronic device 31. The attachment portion 29 may enable the cover 21 to be removably attached to the electronic device 31. The cover 21 may be removably attached to the electronic device 31 so that a user can easily connect and separate the cover 21 and electronic device 31 as needed. The attachment portion 29 may enable a user to connect and separate the cover 21 and electronic device 31 without the need for any additional tools.

In some examples the cover 21 may comprise a casing which is sized and shaped so as to fit tightly around the electronic device 31. In such examples the attachment portion may comprise the edges of the casing which may be arranged to grip the sides of the electronic device 31. A user may be able to attach the cover 21 to the electronic device 31 by pushing the electronic device 31 into the casing. The user may be able to release the cover 21 from the electronic device 31 by bending a part of the casing so that the edges of the casing release the grip on the sides of the electronic device 31. It is to be appreciated that other means for connecting and releasing the cover 21 and the electronic device 31 may be used in other examples of the disclosure.

As mentioned above, in some examples, the cover 21 may comprise components that are not illustrated in FIG. 2. For instance, in some examples the cover 21 could comprise an accelerometer. The accelerometer may comprise any means which enables the orientation of the cover 21 to be determined. The accelerometer may comprise a MEMS (microelectronic mechanical system) or any other suitable system.

Figure 3A:
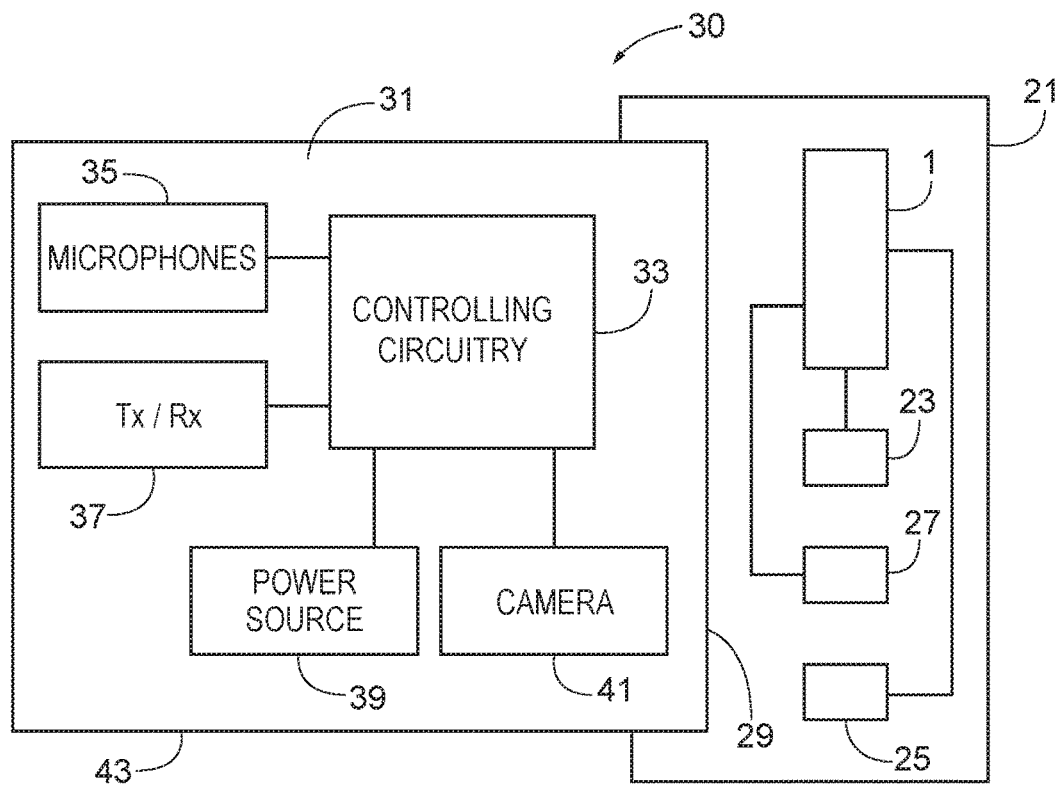
FIGS. 3A and 3B illustrate a system.
Figure 3B:
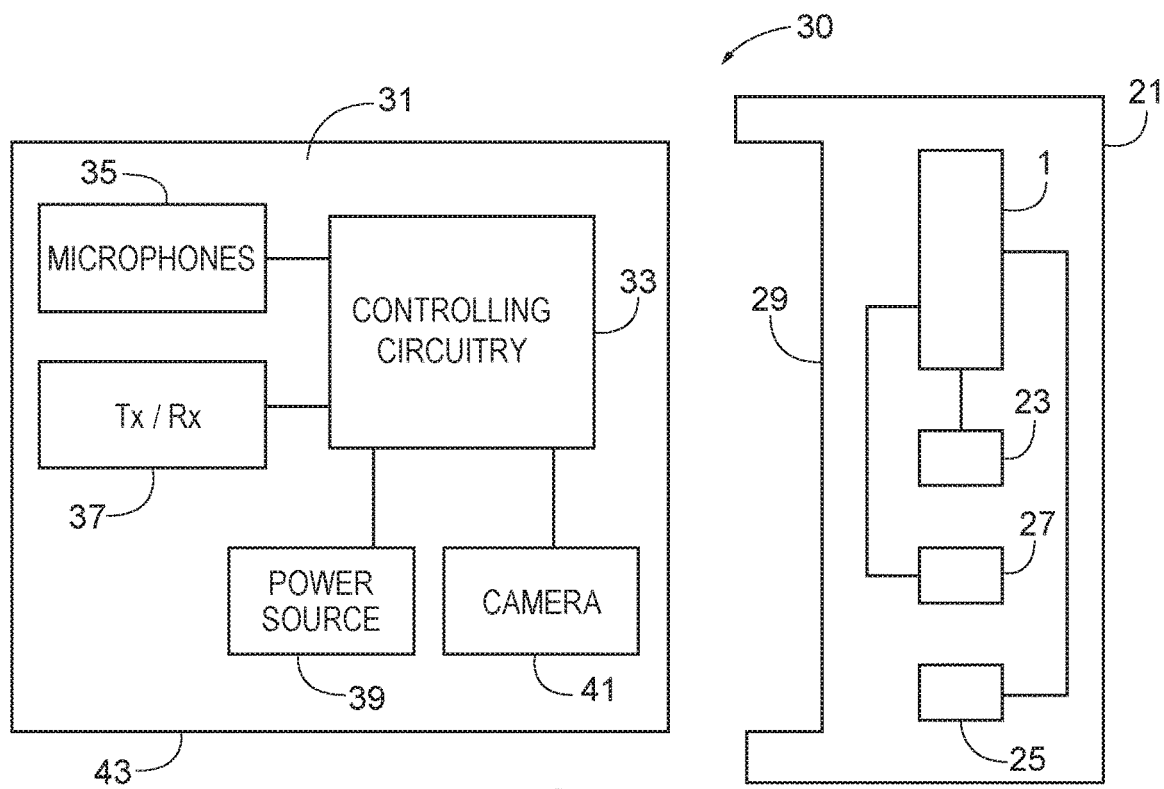

FIGS. 3A and 3B illustrate an example system 30. The system 30 comprises an electronic device 31 and an apparatus 1. The apparatus 1 is provided within a cover 21 which is configured to be removably attached to the electronic device 31. The cover 21 may be as described above. Corresponding reference numerals are used for corresponding features. In FIG. 3A the removable cover 21 is attached to the electronic device 31. In FIG. 3B the removable cover 21 is separated from the electronic device 31.

In the examples of FIGS. 3A and 3B the electronic device 31 may be configured to capture audio signals. In some examples the electronic device 31 may be configured to capture images. The electronic device 31 may be any suitable electronic device such as a mobile phone, a camera, a tablet computer, video camera, television, computer or any other suitable electronic device 31.

In the example of FIGS. 3A and 3B the electronic device 31 comprises controlling circuitry 33, one or more microphones 35, a transceiver 37, a power source 39 and a camera 41. The components of the electronic device 31 are provided within a housing 43.

The controlling circuitry 31 may comprise processing circuitry 5 and memory circuitry 7 which may be configured to store a computer program 9 comprising computer program code 11. The processing circuitry 5 and memory circuitry 7 may be as described above.

The controlling circuitry 33 may be configured to control the electronic device 31. The controlling circuitry 33 may be arranged to control the components illustrated in FIGS. 3A and 3B. The controlling circuitry 33 may be arranged to control functions of the electronic device 31. For instance, in examples where the electronic device 31 is a mobile telephone the controlling circuitry 33 may enable the electronic device 31 to place and receive cellular communications.

The one or more microphones 35 may be similar to the one or more microphones 23 provided in the cover 21. In some examples the electronic device 31 may comprise a plurality of microphones 35 which may be distributed over the electronic device 31 so as to enable a spatial audio signal to be captured.

The one or more transceivers 37 may comprise one or more transmitters and/or receivers. The one or more transceivers 37 may comprise any means which enables the electronic device 31 to establish a communication connection with the cover 21 and exchange information with the cover 21. The communication connection may comprise a wireless connection.

In some examples the one or more transceivers 37 may enable the electronic device 31 to exchange information with the cover 21 when the cover 21 is separated from the electronic device 31. In some examples the one or more transceivers 37 may enable the electronic device 31 to exchange information with the cover 21 when the cover 21 is connected to the electronic device 31. In other examples when the cover 21 is connected to the electronic device the controlling circuitry 33 of the electronic device 31 may be arranged to control components of the cover 21 so that the wireless connection is not needed.

The one or more transceivers 37 of the electronic device 31 may also enable the electronic device 31 to establish a communication connection with other devices. For instance, the one or more transceivers 37 may enable the electronic device 31 to communicate within a cellular network or any other suitable communication network.

The power source 39 may comprise any means for providing power to the components of the electronic device 31. The power source 39 may be configured so that when the cover 21 is connected to the electronic device 31 the power source also provides power to the components of the cover 21. The power source 39 may be configured to enable the power source 39 of the electronic device 31 to be used to charge the power source 25 of the cover 21. The power source 39 of the electronic device 31 may have a larger capacity than the power source 25 of the cover 21.

The example electronic device 31 also comprises a camera 41. In some examples the electronic device 31 may comprise a plurality of cameras 41. The camera 41 may comprise any means which enables the electronic device 31 to capture images. The camera 41 may comprise an image sensor which may be configured to convert light incident on the image sensor into an electrical signal to enable an image to be produced. The image sensors may comprise, for example, digital image sensors such as charge-coupled-devices (CCD) or complementary metal-oxide-semiconductors (CMOS). The images which are obtained may provide a representation of a scene and/or objects which are positioned in front of the camera 41.

The camera 41 may be arranged to obtain still images and/or video images. The camera 41 may be arranged to capture images at the same time as the microphones 35 capture the spatial audio signal.

The cameras 41 may be coupled to the apparatus 1 so that electrical signals comprising captured image information may be provided to the controlling circuitry 33.

The housing 43 may provide an external housing for the electronic device 31. The housing 43 may be configured so that the components of the electronic device 31 are entirely contained within the housing 43. The housing 43 may provide protection for the components of the electronic device 31. For example, the housing 43 may protect the components of the electronic device 31 from atmospheric conditions such as moisture or temperature variations. The housing 43 may also be configured to protect the components of the electronic device 31 from impact forces.

The housing 43 may be arranged so that, when the cover 21 is attached to the electronic device 31, the attachment portion 29 of the cover 21 is connected to a part of the housing 43. In some examples the housing 43 may comprise receiving means which may enable the cover 21 to be securely attached to the electronic device 31.

The electronic device 31 may be configured so that the electronic device 31 is operable both with the cover 21 attached and without the cover 21 attached. In the example system of FIG. 3A the cover 21 is attached to the electronic device 31. When the cover 21 is attached to the electronic device 31 the cover 21 and the electronic device 31 are coupled together. In this configuration the cover 21 provides an additional casing overlaying at least part of the housing 43 of the electronic device 31. The cover 21 may be configured to mechanically interface with the electronic device 31 so that the cover 21 can be fitted to the electronic device 31 to provide the additional casing.

When the cover 21 is connected to the electronic device 31 an electrical connection may be established between the electronic device 31 and the cover 21. This may enable the controlling circuitry 33 of the electronic device 31 to also control functions of the cover 21. For instance this may enable a user to select whether to use the microphones 23 of the cover 21 or the microphones 35 of the electronic device 31 for capturing audio signals. In some examples this may enable both the microphones 23 of the cover 21 and the microphones 35 of the electronic device 31 to be used. For instance, the microphones 35 of the electronic device 31 could be used to capture a main audio signal while the microphones 23 of the cover 21 could be used to capture audio signals which can then be used to remove unwanted sounds such as noise or background sounds.

In the example of FIG. 3B the cover 21 is removed from the electronic device 31. The cover 21 is removed from the electronic device 31 so that the cover 21 is not in contact with the electronic device 31. In the configuration of FIG. 3B there is no direct electrical connection between the cover 21 and the electronic device 31.

When the cover 21 is removed from the electronic device 31 a wireless connection may be established between the cover 21 and the electronic device 31. The wireless connection may enable information to be exchanged between the cover 21 and the electronic device 31. The wireless connection may enable audio signals captured by the cover 21 to be transmitted to the electronic device 31. In some examples the apparatus 1 may be arranged to perform some processing of the captured audio signals before they are transmitted to the electronic device 31.

The wireless connection may also enable the electronic device 31 to send control signals to the cover 21. In some examples the control signals may enable control of the audio signals that are to be captured by the cover 21 and/or the processing of the signals that is to be performed. This may ensure that audio signals captured by the cover 21 may be combined with audio signals captured by the electronic device 31 to obtain an enhanced audio signal.

The enhanced audio signal may comprise any suitable type of audio signal where the audio signal captured by the apparatus 1 is used to modify or enhance an audio signal captured by the electronic device 31. In some examples the enhanced audio signal may comprise a spatial audio signal. In such examples the position of the apparatus 1 relative to the electronic device 31 may be used to create the spatial audio signal. In other examples of the disclosure other types of enhanced audio signals may be created. For instance, in some examples the audio signal captured by the apparatus 1 may be used for noise cancelling. This may improve the quality of the audio signals perceived by the user. In some examples the audio signal captured by the apparatus 1 may be used for beamforming or to create other directional signals. In some examples the captured audio signals may be used to create a stereo audio signal or any other suitable type of enhanced audio signal.

In some examples the audio signal captured by the apparatus 1 may be used to enhance an audio signal captured by the electronic device 31 by increasing the signal to noise ratio of the audio signal. For instance, the apparatus 1 may be removed from the electronic device 31 and positioned closer to the sound source than the electronic device 31. This may enable an improved audio signal to be obtained by the apparatus 1 compared to the electronic device 31.

Figure 4:
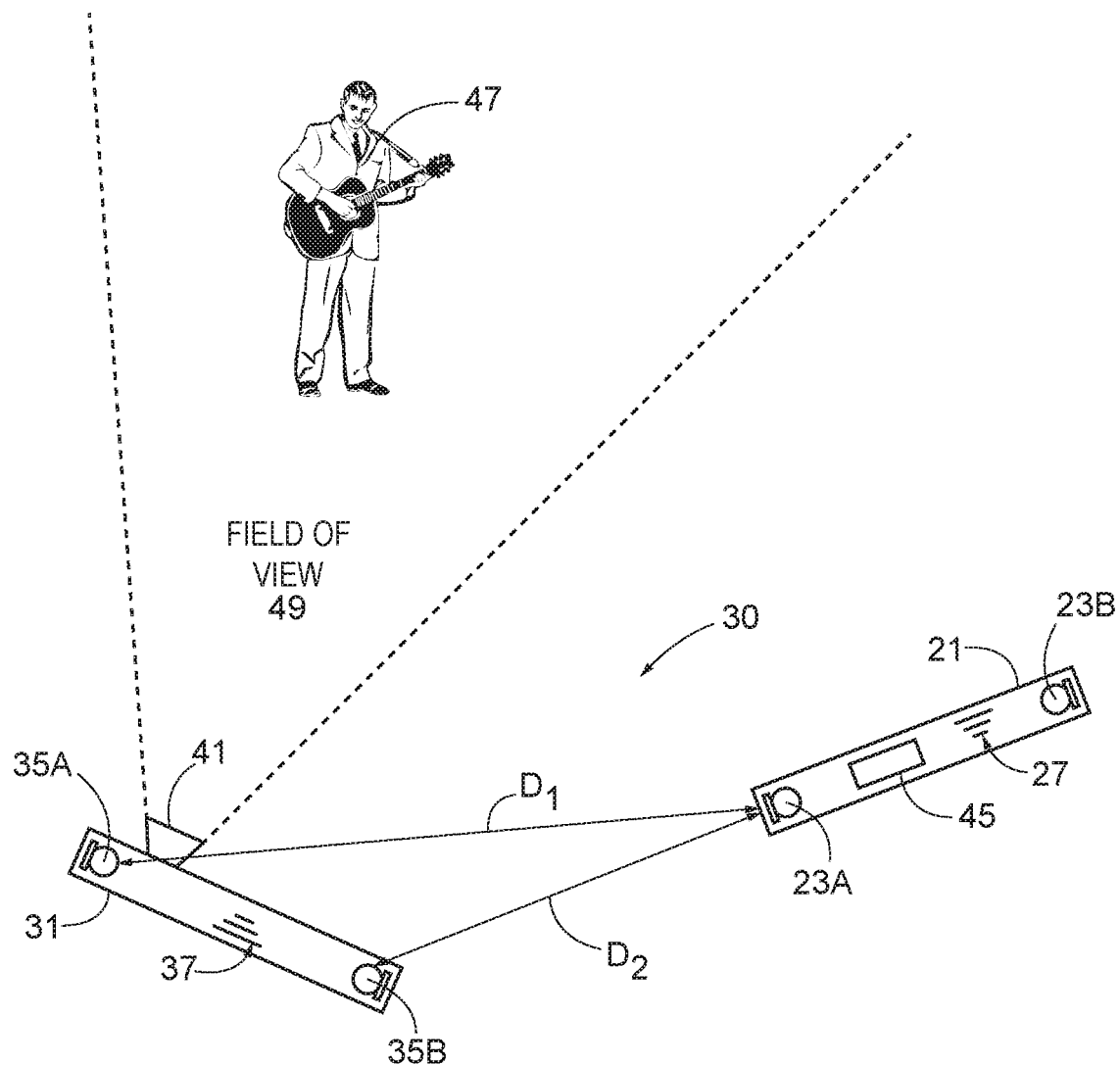
FIG. 4 illustrates a system in use.

FIG. 4 illustrates an example system 30 in use. In the example of FIG. 4 a user is using the system 30 to record a person 47 playing the guitar. The user uses camera 41 of the electronic device 31 to capture images of the person 47 playing the guitar. The user positions the electronic device 31 so that the person playing the guitar 47 is positioned within the field of view 49 of the camera 41. The camera 41 may be used to capture video images and/or still images.

In the example system 30 of FIG. 4 the user uses both the microphones 35 of the electronic device 31 and the microphones 23 of the cover 21 to capture a spatial audio signal. The cover 21 has been separated from the electronic device 31 and is located in a different position to the electronic device 31. In the example of FIG. 4 the cover 21 is located to the right of the electronic device 31. The cover 21 is also rotated relative to the electronic device so that the cover 21 faces in a different orientation to the electronic device 31. Other relative locations and orientations of the cover 21 and electronic device 31 may be used in other examples of the disclosure.

In the example of FIG. 4 the electronic device 31 comprises a first microphone 35A and a second microphone 35B. The first microphone 35A is provided at a first end of the electronic device 31 and the second microphone 35B is provided at a second end of the electronic device 31. The cover 21 also comprises a first microphone 23A and a second microphone 23B. The first microphone 23A is provided at a first end of the cover 21 and the second microphone 23B is provided at a second end of the cover 21. It is to be appreciated that other arrangements of the microphones 23, 35 may be used in other examples of the disclosure.

In order to enable a spatial audio signal to be captured the position of the cover 21 relative to the electronic device 31 is determined. The position of the cover 21 may comprise the location of the cover 21 relative to the electronic device 31. The relative location may be determined by determining the distance between the cover 21 and the electronic device 31 and the bearing of the cover 21 relative to the electronic device 31. The relative orientation may be the angular position of the electronic device 31 relative to the cover 21. The orientation may be determined by determining the rotation of the cover 21 relative to the electronic device 31.

Any suitable methods and/or combinations of methods may be used to determine the position of the cover 21 relative to the electronic device 31. In some examples GPS (global positioning system) may be used to determine the locations of the cover 21 and the electronic device 31. In such examples both the cover 21 and the electronic device 31 may be arranged to communicate within a GPS network. Other systems may be used in other examples of the disclosure. For instance HAIP (high accuracy indoor positioning) or any other suitable system could be used.

Any suitable means may be used to detect the orientation of the cover 21 and the electronic device 31. For instance in some examples, both the cover 21 and the electronic device 31 may comprise an accelerometer which enables the angular orientation of the electronic device 31 and the cover 21 to be determined. In some examples, both the cover 21 and the electronic device 31 may comprise a compass 45 which enables the directions the electronic device 31 and the cover 21 are facing in to be determined. The orientation of the cover 21 relative to the electronic device 31 may be estimated by comparing the compass 45 and/or accelerometer signals obtained by the electronic device 31 and the cover 21.

The example of FIG. 4 shows another method that may be used to determine the position of the cover 21 relative to the electronic device 31. In this example the distances $D_1$ and $D_2$ are determined. $D_1$ is the distance between the first microphone 35A of the electronic device 31 and the first microphone 23A of the cover 21. $D_2$ is the distance between the second microphone 35B of the electronic device 31 and the first microphone 23A of the cover 21. The distances $D_1$ and $D_2$ may be determined from a time difference of arrival (TDOA) of signals detected by the respective pairs of microphones.

The location of the cover 21 and the electronic device 31 can be determined by comparing the distances $D_1$ and $D_2$. In the example of FIG. 4 $D_1$ is greater than $D_2$. This indicates that the cover 21 is located to the right of the electronic device 31. Conversely if $D_1$ was less than $D_2$ this would indicate that the cover 21 is located to the left of the electronic device 31.

If the difference between $D_1$ and $D_2$ is within a threshold this may indicate that the cover 21 is located in front of the electronic device 31. In some examples if the difference between $D_1$ and $D_2$ is within a threshold this may indicate that cover 21 is located within the field of view 49 of the camera 41.

In the above described example only two pairs of microphones 35, 23 are used to determine the relative location. This arrangement does not take into account that the cover 21 could be located above, below or behind the electronic device 31. It is to be appreciated that such location information could be obtained using further pairs of microphones 23, 35. In some examples, if sufficient pairs of microphones 23, 25 are available then the distances between the pairs of microphones 23, 35 could also be used to determine the orientation of the cover 21 relative to the electronic device 31 as well as the relative location. In such examples three microphones 23, 35 may be needed in both the cover 21 and the electronic device 31.

Once the position of the cover 21 relative to the electronic device 31 has been determined an audio signal is captured. At least some of the audio signal is captured by the cover 21. The audio signal captured by the cover 21 may then be transmitted to the electronic device 31 via the wireless connection. The electronic device 31 may the use the captured audio signal to create an enhanced audio signal. In the example of FIG. 4 the electronic device 31 may used the captured audio signal and the determined position of the cover 21 relative to the electronic device 31 to create a spatial audio signal.

In some examples once the position of the cover 21 relative to the electronic device 31 has been determined the electronic device 31 may send a control signal to the cover 21 to control the algorithms that are used by the apparatus 1 in the cover 21 to capture the audio signal. In some examples the electronic device 31 may control the audio signals that are obtained by both the microphones of the electronic device and the microphones of the cover to obtain a desired enhanced audio signal. For instance, in the example of FIG. 4 the cover 21 is located to the right of the electronic device 31. The electronic device 31 may control the system 30 so that the microphones 23 in the cover 21 are used to capture a right output signal and the microphones 35 in the electronic device 31 may be used to capture a left output signal.

Figure 5:
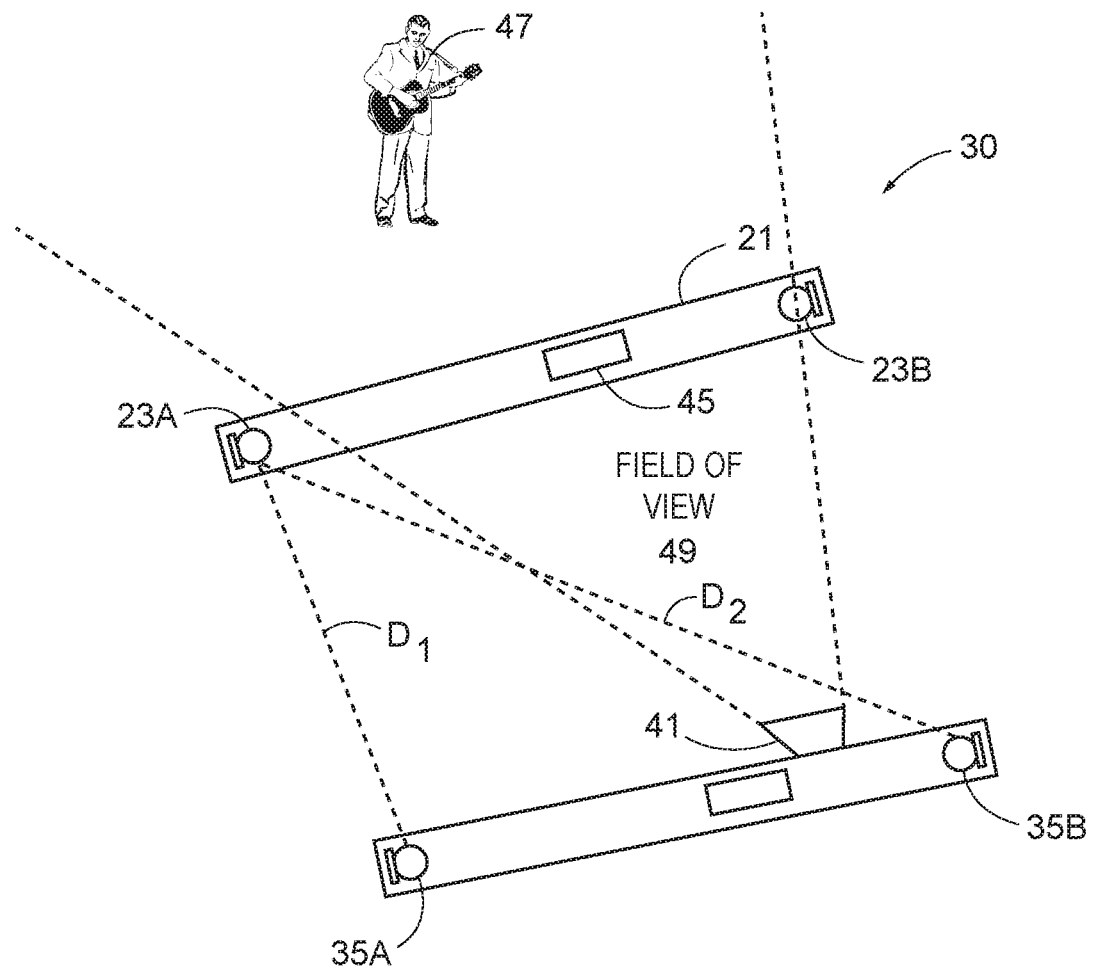
FIG. 5 illustrates a system in use.

FIG. 5 illustrates a system 30 similar to the system of FIG. 4 with the cover 21 in a different position relative to the electronic device 31. In the example of FIG. 5 the cover 21 is located in front of the electronic device 31 so that the cover 21 is located at least partially within the field of view 49 of the camera 41. It is to be appreciated that the cover 21 could be located above or below the electronic device 31 so that the cover 21 does not block images obtained by the camera 41.

In the example of FIG. 5 it may be determined that the difference between $D_1$ and $D_2$ is within a threshold which indicates that that the cover 21 is located at least partially within the field of view 49 of the camera 41. In such examples, once the relative position of the cover 21 has been determined the electronic device 31 may control the system 30 to obtain stereo audio signals. In such examples the audio signals captured by the cover 21 may be added to the audio signals captured by the electronic device 31 to create a stereo audio signal.

Figure 6:
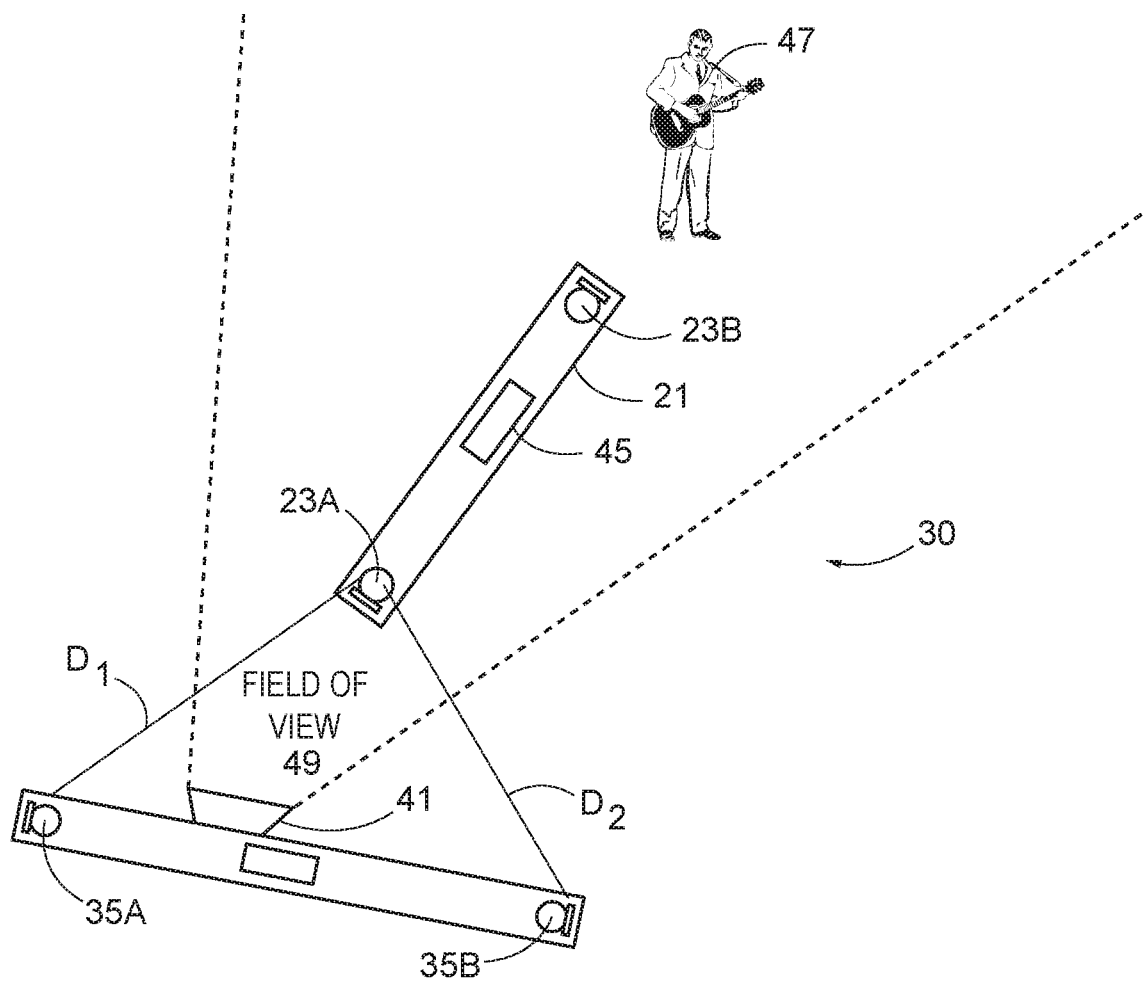
FIG. 6 illustrates a system in use.

FIG. 6 illustrates another system 30 similar to the systems of FIGS. 4 and 5. In the example of FIG. 6 the cover 21 is located in front of the electronic device 31 so that the cover 21 is located at least partially within the field of view 49 of the camera 41. In the example of FIG. 6 the cover 21 has been rotated so that it is orientated perpendicularly to the electronic device 31. The length of the cover 21 is arranged so that it extends perpendicular to a front face of the electronic device 31.

In the example of FIG. 6 it may be determined that the difference between $D_1$ and $D_2$ is within a threshold which indicates that that the cover 21 is located at least partially within the field of view of the camera 41. A compass, or accelerometer or other pairs of microphones or any other suitable method may be used to determine the relative orientation of the cover 21.

In such examples, once the relative position of the cover 21 has been determined the electronic device 31 may control the cover 21 to obtain a beamformed audio signal. In such examples beamformed audio signal obtained by the cover 21 may be added to the audio signals captured by the electronic device 31 to create an enhanced audio signal.

In some examples the system 30 may be arranged so that the types of algorithms to be applied to the captured audio signals are automatically selected from the relative position of the cover 21 and the electronic device 31. For instance, if the cover 21 is arranged in the configuration of FIG. 6 the electronic device 31 may automatically control the cover 21 to obtain a beamformed signal. This may make the system easier to use as it may reduce the need for user input. In other examples a user may be able to select which types of algorithms they would like to be applied.

In the examples of the disclosure the apparatus 1 of the cover 21 may be arranged to perform at least some of the algorithms for creating the enhanced audio signal. For instance, in the example of FIG. 6 where the cover 21 is used to create a beamformed signal the apparatus 1 within the cover may perform the beamforming so that the beamformed output is transmitted to the electronic device 31. This may reduce the information that needs to be transmitted between the cover 21 and the electronic device 31. In other examples all of the processing might be carried out by the electronic device 31.

In examples of the disclosure, if is determined that the cover 21 is outside the field of view 49 of the camera 41 the cover 21 may be used to improve the spatial attributes of the enhanced audio signal. This may be achieved using a spaced microphone technique. In such examples no delay compensation is needed between the audio signals captured by the microphones 23 in the cover 21 and the microphones 35 in the electronic device 31 because the delays are used to create the spatial attributes of the enhanced audio signal.

If it is determined that the cover 21 is outside the field of view 49 of the camera 41 the cover 21 may be used to improve the quality of the audio signal captured from an object within the field of view 49 of the camera 41. In the above examples the object is the person 47 playing the guitar. It is to be appreciated that other objects may be used in other examples of the disclosure. In such examples the audio signals captured by the cover 21 may be used to beamform sound from the object and/or attenuate sound from other objects.

In such cases the audio signals captured by the cover 21 would be added to the audio signals captured by the electronic device 31. In these cases it may be beneficial to compensate for the time difference that it takes for sound from the object to arrive at the cover 21 and the electronic device 31. In the examples of FIGS. 5 and 6 the cover 21 is located closer to the object than the electronic device 31 is. This means that sound from the object will reach the cover 21 before it reaches the electronic device 31. In such examples the spatial audio signal that is created will use the distance between the cover 21 and the electronic device 31 to compensate for this delay when producing the spatial audio signal. The delay t that would be need is given by:

$$t = \frac{\text{(Distance between cover and electronic device)}}{\text{(speed of sound)}}$$

Figure 7:
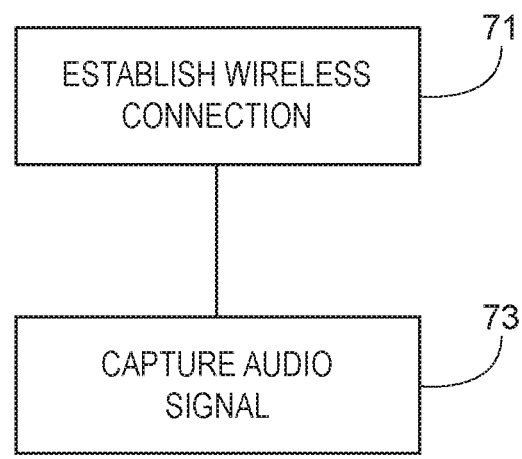
FIG. 7 illustrates a method.

FIG. 7 illustrates a method. The method may be implemented using apparatus 1 as described above. The method comprises, at block 71, enabling a wireless connection to be established between an apparatus 1 and an electronic device 31. The method also comprises, at block 73, capturing an audio signal and enabling the captured audio signal to be sent to the electronic device 31 using the wireless connection to enable the captured audio signal to be used to create an enhanced audio signal. The apparatus 1 is arranged to be removeably attachable to the electronic device 31.

In the examples described above the apparatus 1 and the electronic device 31 are used to capture audio signals that could be stored in memory circuitry for playback at a later time and/or for sending to another device. In some examples the apparatus 1 and electronic device 31 could be used to obtain audio signals that are played in real time or as soon as they are received.

For instance, examples of the disclosure could be used to monitor a sound source in a different location to the electronic device. The cover 21 could be positioned close to the sound source or in a location where the sound from the sound source can be captured. The electronic device 31 can then be positioned in a different location. The different location could be close to the user and may be a location in which the sound from the sound source cannot be heard or cannot be heard clearly. This would enable any sounds made by the sound source to be captured by the cover 21 and transmitted to the electronic device 31 where it could be played back immediately. This would enable the user to monitor the sound source without having to be in the positioned close to the sound source.

As an example a user may be in a meeting but may have to leave the meeting room for a period of time. The user may still wish to monitor what is happening in the meeting and so may leave the cover 21 in the meeting room but keep the electronic device 31 with them. The cover 21 may then transmit the audio from the meeting room to the electronic device 31 to enable the user to continue to listen to the meeting via the electronic device 31.

Examples of the disclosure enable a user of an electronic device 31 to obtain enhanced audio signals. As further microphones 23 may be provided in a detachable cover 21 the user always has additional microphone 23 capabilities. As the cover 21 is detachable the user can position the cover 21 and the electronic device 31 into their chosen positions. This may enable the same cover 21 and electronic device 31 to be used to obtain different types of enhanced audio signals in different configurations.

As the electronic device 31 may comprise a camera 41 the camera 41 and the microphones 23 are not in fixed relative positions. This may enable a user to position the cover 21 so as to enable high quality audio signals to be obtained and position the electronic device 31 so as to enable high quality images to be obtained.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus configured as a removable cover arranged to be removeably attachable to an electronic device, wherein the removable cover is configured such that, when attached to the electronic device, the removable cover overlays at least part of a housing of the electronic device to provide a casing to the electronic device, and wherein the apparatus comprises:
   processing circuitry; and
   memory circuitry including computer program code, the memory circuitry and the computer program code configured to, with the processing circuitry, enable the apparatus to:
   enable a wireless connection to be established with the electronic device;
   while the apparatus is physically unattached from the electronic device, capture at least one audio signal with the apparatus;
   determine a position of the apparatus relative to at least one of the electronic device to which the apparatus is removably attachable, or a sound source; and
   enable the captured at least one audio signal to be sent to the electronic device using the wireless connection to enable the captured at least one audio signal to be enhanced based on the position of the apparatus relative to the at least one of the electronic device to which the apparatus is removably attachable, or the sound source.

2. The apparatus as claimed in claim 1 wherein determining the position of the apparatus comprises determining the position of the apparatus relative to the electronic device.

3. The apparatus as claimed in claim 1 wherein determining the position of the apparatus comprises determining an orientation of the apparatus.

4. The apparatus as claimed in claim 1 wherein determining the position of the apparatus comprises determining the position of the apparatus relative to a field of view of a camera of the electronic device, wherein the position of the apparatus relative to the field of view of the camera of the electronic device is used to enhance the at least one audio signal.

5. The apparatus as claimed in claim 1 wherein the processing circuitry and the memory circuitry are configured to enable at least some processing of the captured at least one audio signal before it is transmitted to the electronic device.

6. The apparatus as claimed in claim 1 wherein the processing circuitry and the memory circuitry are configured to enable the apparatus to receive at least one control signal from the electronic device.

7. The apparatus as claimed in claim 6 wherein the received at least one control signal enables control of capture of the at least one audio signal.

8. The apparatus as claimed in claim 6 wherein the received at least one control signal enables control of processing of the captured at least one audio signal before they are transmitted to the electronic device.

9. The apparatus as claimed in claim 1 wherein the at least one audio signal is further enhanced based on at least another of the at least one audio signal captured via the apparatus and at least one audio signal captured via the electronic device.

10. The apparatus as claimed in claim 1 wherein the removable cover comprises one or more microphones.

11. The apparatus as claimed in claim 1 wherein the removable cover comprises a power source.

12. The apparatus as claimed in claim 1 wherein the removable cover comprises one or more transceivers configured to enable wireless communications.

13. A method comprising:
   enabling a wireless connection to be established between an apparatus configured as a removable cover, and an electronic device, wherein the apparatus is arranged to be removably attachable to the electronic device, and wherein the removable cover is configured such that, when attached to the electronic device, the removable cover overlays at least part of a housing of the electronic device to provide a casing to the electronic device; and
   while the apparatus is physically unattached from the electronic device, capturing at least one audio signal at the apparatus and enabling the captured at least one audio signal to be sent to the electronic device using the wireless connection to enable the captured at least one audio signal to be enhanced based on a position of the apparatus relative to at least one of the electronic device to which the apparatus is removably attachable, or a sound source.

14. The method as claimed in claim 13, wherein determining the position of the apparatus comprises determining the position of the apparatus relative to the electronic device.

15. The method as claimed in claim 13, wherein determining the position of the apparatus comprises determining an orientation of the apparatus.

16. The method as claimed in claim 13, wherein determining the position of the apparatus relative to the electronic device comprises determining the position of the apparatus relative to a field of view of a camera of the electronic device, wherein the position of the apparatus relative to the field of view of the camera of the electronic device is used to enhance the at least one audio signal.

17. An electronic device configured to have a removable cover attached thereto, such that when attached to the electronic device, the removable cover overlays at least part of a housing of the electronic device to provide a casing to the electronic device, wherein the removable cover comprises one or more microphones, wherein the electronic device comprises:

processing circuitry; and memory circuitry including computer program code, the memory circuitry and the computer program code configured to, with the processing circuitry, enable the electronic device to:

enable a wireless connection to be established with the removable cover while the removable cover is physically unattached from the electronic device;

enable at least one audio signal captured by the removable cover to be received from the removable cover using the wireless connection, wherein the at least one audio signal is captured via the one or more microphones of the removable cover while the removable cover is physically unattached from the electronic device; and enable the captured at least one audio signal to be enhanced based on a position of the removable cover relative to at least one of the electronic device from which the removable cover is unattached, or a sound source.

18. The apparatus according to claim 1, wherein the apparatus configured as the removable cover comprises two or more microphones and the enhancement of the captured at least one audio signal is performed by processing signals from the two or more microphones.

19. The method according to claim 13, wherein the apparatus configured as the removable cover comprises two or more microphones and the enhancement of the captured at least one audio signal is performed by processing signals from the two or more microphones.

\* \* \* \* \*